3,023,162
DEWATERING AQUEOUS SUSPENSIONS WITH QUATERNIZED DIALKYLAMINOALKYL ACRYLATES OR METHACRYLATES
David B. Fordyce, Moorestown, N.J., and Frank J. Glavis, Elkins Park, and Sidney Melamed, Philadelphia, Pa., assignors to Rohm & Haas Company, Philadelphia, Pa., a corporation of Delaware
No Drawing. Filed Mar. 10, 1958, Ser. No. 720,063
17 Claims. (Cl. 210—54)

This invention is concerned with the treatment of aqueous suspensions of finely divided water-insoluble solid materials, such as minerals or organic matter, to facilitate the removal of water therefrom by such processes as filtration, sedimentation and decantation, and variations thereof in which the water remains in liquid phase throughout such removal. It is particularly concerned with the treatment of such aqueous suspensions with improved flocculating agents which increase the filtration rate of the suspensions. Settling rates of the suspended matter and clarity of the supernatants are also markedly increased. This application is a continuation-in-part of each of copending applications Serial Nos. 467,872, filed November 9, 1954; 550,484, filed December 1, 1955; and 577,196, filed April 10, 1956, all now abandoned.

In numerous mineral dressing operations, it is necessary to separate water from an aqueous suspension of inorganic or mineral matter, such as clays, finely divided precipitates, and the like, having an extremely fine state of sub-division from less than one micron to about 50 microns which suspension may have a pH between about zero and 14 and frequently is either highly acid such as at a pH of 4 or less or highly alkaline at a pH of 9 or more. Settling of suspended matter from such suspensions is extremely slow so that it is generally the practice to add a flocculating agent, such as glue, acids, starches, and various natural gums, to cause the individual particles to flocculate by some interaction with the molecules of the flocculating agent in order to reduce the holding time in settling basins or vessels before decantation of the supernatant liquor can be carried out. Similarly, removal of water from such suspensions by filtration is frequently aided by the addition of a flocculant to avoid the rapid development of an impermeable filter cake through which filtration can be effected only at extremely slow rates and/or under extremely high pressures.

Polyanionic polymer types of flocculants heretofore recommended for flocculation of such aqueous dispersions, such as sodium polyacrylates, including the sodium salts of hydrolyzed polyacrylonitrile, are of little use in flocculating suspended matter in aqueous suspensions unless the suspended matter is already partially flocculated because of some other influence; in such cases, the action is essentially a mere floc stabilization, and not the manifestation of inherent capacity of the polyanionic polymer to flocculate a completely dispersed mineral substance in an aqueous suspension. These polyanionics are especially ineffective in low pH systems.

In accordance with the present invention, it has been found that effective flocculation of suspended matter in aqueous media can be obtained by the addition to such aqueous suspensions of high molecular weight-water-soluble linear polymeric esters of methacrylic or acrylic acid containing basic tertiary amine groups at least about 45% of which have been converted to quaternary ammonium groups by means of a $C_2$—$C_3$ alkylene oxide.

These linear polymers contain units consisting of 0 to about 55 mole percent of at least one ester unit (or a salt or salts thereof) having the structure of the formula:

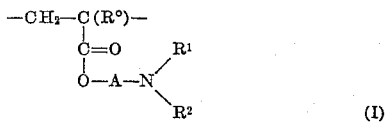

(I)

and about 45 to 100 mole percent of at least one quaternary unit having the structure of the formula:

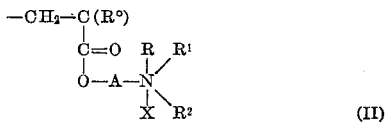

(II)

where R° is selected from the group consisting of H and $CH_3$, and is preferably $CH_3$, A is selected from the group consisting of —$(CH_2)_2$—, —$(CH_2)_3$—, and —$CH_2CH(CH_3)$—, $R^1$ is selected from the group consisting of methyl and ethyl, $R^2$ is selected from the group consisting of methyl and ethyl, R is selected from the group consisting of β-hydroxyethyl, β-hydroxypropyl, and γ-hydroxypropyl, and X is selected from the group consisting of hydroxyl and negative, salt-forming radicals and atoms. Examples of these negative radicals include halides, such as chloride, bromide, and iodide, sulfate, e.g., the methyl sulfate anion, acetate, tartrate, propionate, citrate, phosphate, and so on. The units of formula I may be in the form of a salt, such as the hydrochloride, hydroacetate, phosphate, hydroformate, sulfate, etc.

Preferred polymers are those in which at least 80% of the amine-containing units have been quaternized by the alkylene oxide. Such polymers generally provide optimum flocculating effects on the widest variety of materials.

The methacrylates in which R° is $CH_3$ are also preferred since they are more stable than the acrylates wherein R° is H especially when the systems involve the higher portion of the alkaline pH range of 12 or more. For simplicity, the following description refers to the methacrylates but it also applies generally to the corresponding acrylates.

The linear polymers of the present invention have a viscosity average molecular weight of at least 300,000 and preferably at least 500,000 and may have as high a molecular weight as is possible to attain, such as several million.

"Water-soluble" as used herein is intended to include polymers which produce true-solutions or colloidal solutions when they are present in the aqueous media in the small proportions hereinafter specified.

The quaternary compounds may be formed by quaternization of a polymer of an N-disubstituted aminoalkyl methacrylate (having units of formula I) with ethylene oxide, propylene oxide, or trimethylene oxide.

The water-soluble linear polymers of the present invention may be made by the direct polymerization of the aminoalkyl esters of methacrylic acid or their salts or quaternaries to form a homopolymer of any one of them or a copolymer of any two or more thereof. Then the polymeric amine or salt is quaternized unless it has been copolymerized with a sufficient proportion of an already quaternized monomer. For example, polymers of dimethylaminoethyl methacrylate, diethylaminoethyl methacrylate, 3-(dimethylamino)- or 3-(diethylamino)-propyl methacrylate and 2-(dimethylamino)-isopropyl methacrylate and their salts may have about 45% to 100% of their amine groups quaternized by one, or a mixture of two or more, of the alkylating agents mentioned above.

In any instance where a comonomer is of a type which tends to form hydrophobic polymers, the proportion of such comonomer should not be so large as to produce a quaternized copolymer which is not water-soluble as defined above.

The effectiveness of the polymers of the present invention for the flocculation of predominantly organic matter from aqueous suspensions thereof, such as from sewage sludges is surprising and quite remarkable in view of the fact that other types of polymers, such as guar gum, polyacrylamide, and the partial calcium salt of the copolymer of vinyl acetate with a maleic acid-half ester, have relatively little flocculating effect upon such aqueous suspensions of organic matter as sewage sludges, so that the practice in conventional operations remains to use inorganic materials, generally a combination of ferric chloride and lime, for the treatment of such sludges. A large proportion of the inorganic treating materials are used amounting to from 2% to 10% of ferric chloride in conjunction with about 5% to 12% of lime. A quite common practice is to use a mixture of 3% ferric chloride and 6% lime based on suspended solids.

To carry out the process of the invention, there is added to and mixed into the aqueous suspension which may be acid, neutral or alkaline and may contain up to about 60% by weight of suspended matter (either of mineral or of predominantly organic character) to be flocculated from 0.001% to 3% by weight, based on the weight of the suspended matter, of the water-soluble linear polymer hereinabove defined when the suspended matter is essentially mineral in character and from 0.01% to 5% by weight of the polymer, based on the weight of suspended matter when it is of predominantly organic character, as in the case of a sewage sludge. By the present invention, it is possible to obtain a dried filter cake of digested sludge which has no iron contamination and which may consequently be expected to be a more widely useful fertilizer.

The precise amount of flocculant added may depend upon the particular system and frequently depends upon the size of the particles to be flocculated or the surface area thereof. For example, bentonite particles have extremely high surface areas and, when the suspended matter contains a large proportion thereof, the suspensions require, apparently on that account, as much as 1% to 3% by weight (based on the weight of suspended matter) of the flocculating agent to produce optimum results. For most systems encountered in ore-dressing operations, however, the preferred proportions of flocculant are from 0.01 to 0.2% by weight of the suspended matter.

The flocculants of the present invention are characterized by high efficiency throughout the range of pH values of the acidic suspensions obtained in ore dressing operations involving acid treatment, as in the leaching of ores with acid or in the dissolving of a desired mineral by the acidification of the products of alkaline fusions of the ore or mineral. The pH may range from a value of 4 down to the lowest pH values practically attainable in the neighborhood of zero.

The flocculants of the present invention are also characterized by high efficiency throughout the range of pH values from 9 to 14 which is characteristic of the alkaline suspensions obtained in ore-dressing operations involving alkaline treatment, as in the leaching of ores with an alkali, such as sodium or potassium carbonate or in the dissolving of a desired mineral from the products of alkaline fusions of the ore or mineral. The pH may range from a value of 9 up to the highest pH values practically attainable in the neighborhood of 14. The polymers of the present invention are surprisingly effective in the treatment of hot (about 50° to about 100° C.) alkaline suspensions as well as those at lower temperatures down to just above the freezing point of water or of the suspension. They have outstanding effectiveness even in the extremely alkaline condition of pH range of 11 or 12 to 14 where simple polymers of unquaternized amines such as homopolymers of units of formula I are of little practical use.

The flocculants of the present invention are applicable in ore-dressing operations where finely divided insoluble chemical precipitates or suspended materials are formed or present in acid or alkaline suspensions or where acid or alkaline solutions of substances to be recovered contain suspended therein finely divided water-insoluble mineral or inorganic substances. The flocculants are generally effective regardless of the concentration of the suspended material in the suspension provided only that the suspension has sufficient mobility or fluidity to allow intimate and thorough mixing of the flocculant throughout its body.

In various mineral dressing operations in metallurgical industries, finely-divided insoluble inorganic material is frequently present as suspended matter in aqueous alkaline systems, and it is frequently necessary to remove such material by a sedimentation and decantation procedure or by a filtration procedure. Examples of such suspended materials include calcium silicate, silica, and calcium sulfate. In such systems, from 0.1% to 0.2% of one of the flocculants of the present invention, such as a quaternized polymer of dimethylaminoethyl methacrylate obtained by reaction of the polymer with ethylene oxide having a viscosity average molecular weight of at least 300,000 is added before settling or before filtration to hasten the settling and thereby reduce hold-up time in the settling tanks or basins, and, in the case of filtration, to increase the rate of filtration with or without a reduction of the pressure necessary to effect the filtration.

In metallurgical industries, also, ores containing the desired mineral are generally ground or otherwise reduced to small particle size. In such systems, it is frequently necessary to produce extremely finely-divided particles to facilitate solution in acids, such as in hydrochloric, nitric, or sulfuric acid, or in alkalies, such as in sodium or potassium carbonate or hydroxide, of the desired mineral component, and the handling of the acid or alkaline aqueous suspensions containing such particles is aided by the addition to such suspensions of flocculating agents of the present invention in the proportions given above. The flocculating agents of the present invention are applicable to a wide variety of suspensions of minerals and ore pulps obtained in such metallurgical industries. For example, the flocculants of the present invention are advantageous for addition to the suspensions obtained from the alkaline-leaching of gold and uranium ores, for addition to alkaline phosphate tailings suspensions that are formed during the manufacture of calcium phosphate, and for addition to sodium carbonate and sodium bicarbonate liquors contaminated with small amounts of siliceous material. The flocculants of the present invention are also extremely advantageous for addition to such suspensions as are obtained as the result of the acid leaching of gold ores, copper ores, copper flotation concentrates, copper tailings, and copper residues, those obtained from acid-leached bauxite ores, acid-leached vanadium ores, acid-leached zinc sulfide concentrates, acid-leached cyanidation tailings containing pyrite, gold and uranium-bearing materials, acidic titanic sulfate digestion residues from crude titaniferous materials such as ilmenite ore concentrates, etc., as well as acidic suspensions of various ores and minerals such as zinc refinery sludges, flotation products, zirconium oxide, iron oxide slimes, etc.

Also, the flocculating agents of the present invention are useful for facilitating the dewatering of many aqueous suspensions of organic materials whether the suspended matter is entirely organic or is a mixture of organic with inorganic materials in which the organic portion predominates by weight. Examples of such aqueous suspensions include industrial wastes, such as that discharged from dairies and canneries, distillery wastes, fermentation wastes, wastes from paper-manufacturing plants, wastes from dyeing plants, sewage suspensions such as any type of sludge derived from a sewage treatment plant, such as a digested sludge, an activated sludge, a raw or primary sludge or mixtures thereof. The filtration and sedimentation of such waste materials are generally complicated by the fact that they are rather complex in character and may include combinations of finely divided organic and/or inorganic materials which are relatively inert in conjunction with finely divided hydrophilic organic matters which are in swollen condition and thereby tend to interfere with filtration and make the drying of either a filter cake or sediment cake practically impossible. They may also contain, besides hydrophilic polymeric materials, which swell and give the difficulties just mentioned, surface active agents such as detergents, dispersing agents and protective colloid agents, all of which tend to maintain the material in suspended condition and enhance the problems encountered in filtering and/or sedimentation.

The concentration of predominantly organic suspended matter may be from 0.01% to 50% but is generally in the range of 0.10% to 10% concentration by weight in the aqueous suspensions to be treated. It has been found that flocculation of the suspended predominantly organic matter can be readily effected by incorporating and mixing into the suspension a small proportion, on the order of 0.01% to 5% by weight (based on the weight of suspended matter), of the flocculating agents defined hereinabove. Frequently, the preferred proportion giving the greatest efficiency is in the range of about 0.1% to 0.35% of the flocculating agent on the total weight of suspended matter. Generally, this is the preferred range for such difficult suspensions as sewage sludges.

After introduction of the flocculating agent, the suspension may be allowed to settle and then decanted or the suspension may be filtered. The use of the flocculating agents of the present invention has been found to increase the filtration rate and the sedimentation rate.

In the following examples which are illustrative of the applicability of the present invention, several polymers of the present invention designated AQ, BQ-1, BQ-2, CQ-1, CQ-2, DQ, EQ, FQ, GQ, and K are compared with each other, sometimes with polyacrylamide and/or a hydrolyzed polyacrylonitrile, and sometimes with the corresponding polymeric t-amines free of quaternary groups designated A, B, C, D, and E respectively. Polymer A defined hereinbelow had an intrinsic viscosity of 4.20 deciliters per gram as determined in 2 N sodium chloride at 30° C. This is indicative of a viscosity average molecular weight far in excess of 300,000 and is believed to be on the order of several million. The viscosity average molecular weights of these various polymers are above 300,000 as indicated by the Stormer viscosities given hereinbelow for comparative purposes. The viscosities given below are in poises and are determined on 1% aqueous solutions with a Stormer viscometer which had been modified as suggested by Fischer and Lindsley (Textile Res. J. XVIII, 325, 1948). In these viscosity determinations, there was used a cup of 1.375 inches diameter and a bob having a diameter of 1.232 inches and a height of 1.388 inches. The mean rate of shear at which viscosities were determined was 95 reciprocal seconds (100 r.p.m.). In the case of the hydrolyzed polyacrylonitrile, a 1% aqueous solution of the sodium salt having a pH of 8.6 was used for the viscosity determination. The quaternary polymers of the invention were in salt form (FQ and GQ being salts of phosphoric acid and the others being salts of acetic acid) dissolved in 1% concentration (percentage based on free amine plus quaternary acetate or, in the case of the phosphate salt, on amine phosphate plus quaternary phosphate content) in water for the viscosity determinations. Polymers A, B, C, D, and E were dissolved in acetic acid salt form in 1% concentration in water (percentage based on free amine content) for the viscosity determinations. For each polymer, the pH of the solution on which viscosity measurement was made is given. In all cases, the viscosity determinations were made upon the solutions mentioned above at 30° C.

The polymers are as follows:

Polymer A is a homopolymer of dimethylaminoethyl methacrylate having a viscosity of 1.88 and a pH of 5.31.

Polymer AQ is the quaternized product obtained from the reaction of polymer A with 1.40 equivalents of ethylene oxide. It has 87% of its amine groups quaternized by the ethylene oxide. It has a viscosity of 1.20 and a pH of 6.90.

Polymer B is a homopolymer of dimethylaminoethyl methacrylate having a viscosity of 1.32 and a pH of 5.19.

Polymer BQ-1 is the quaternized product obtained from the reaction of Polymer B with 0.9 equivalent of ethylene oxide. Degree of quaternization=49%. Viscosity=1.05. pH=5.41.

Polymer BQ-2 is the quaternized product obtained from the reaction of Polymer B with 1.54 equivalents of ethylene oxide. Degree of quaternization=81%. Viscosity=0.92. pH=6.50.

Polymer C is a homopolymer of dimethylaminoethyl methacrylate having a viscosity of 1.10 and a pH of 4.75.

Polymer CQ-1 is the quaternized product obtained from the reaction of polymer C with 5.4 equivalents of propylene oxide. It has a viscosity of 0.65 and a pH of 7.15.

Polymer CQ-2 is the quaternized product obtained from the reaction of Polymer C with 3.6 equivalents of ethylene oxide. It has a viscosity of 0.73 and a pH of 6.65.

Polymer D is a homopolymer of dimethylaminoethyl methacrylate having a viscosity of 1.05 and a pH of 4.90.

Polymer DQ is the quaternized product obtained from the reaction of Polymer D with 0.81 equivalents of propylene oxide. Viscosity=0.97. pH=6.65.

Polymer E is a homopolymer of diethylaminoethyl methacrylate having a viscosity of 0.54 and a pH of 4.85.

Polymer EQ is the quaternized product obtained from the reaction of Polymer E with 1.7 equivalents of ethylene oxide. Viscosity=0.35. pH=6.95.

Polymer FQ is a homopolymer of $\beta$-(N,N-dimethylamino)-ethyl methacrylate of which 87½% of the units have been quaternized with ethylene oxide, the polymer having a 1% aqueous viscosity of 0.90 and a viscosity average molecular weight of several million. pH=5.05.

Polymer GQ is a homopolymer of $\beta$-(N,N-dimethylamino)-ethyl metahcrylate of which about 88% of the units have been quaternized by ethylene oxide, the polymer having a viscosity of 0.92 and a viscosity average molecular weight of several million.

Polymer K is the quaternary formed by the addition reaction of propylene oxide with Polymer D in the hydroacetate form. Based on the titration determinations, the molar ratio of quaternized groups to amine groups is about 1.3. Viscosity=0.97. pH=6.65.

Polymer HPAN is a sodium salt of 70% hydrolyzed polyacrylonitrile. This polymer had a viscosity of 0.72 poise as determined above. Its intrinsic viscosity [$\eta$] in 2 N NaCl at 30° C. is 1.45 corresponding to an average molecular weight of the order of 500,000.

Polymer PAM is a polymerized acrylamide having an intrinsic viscosity [$\eta$] of 3.47 as determined in 0.1 N sodium chloride at 30° C. It has an estimated molecular weight of the order of 500,000. A 1% aqueous solution of the polymer has a viscosity of 0.135 poise and a pH of 5.18.

Polymer PAM-2 is a polymerized acrylamide having an intrinsic viscosity [$\eta$] of 6.64 as determined in 0.1

N sodium chloride at 30° C. It has an estimated molecular weight of the order of several million.

In all examples the amine-containing or quaternary nitrogen-containing polymers were added in the form of their salts. For hydroacetate salts the percentage of amine-containing or quaternary nitrogen-containing polymer is based on the free amine or in the case of quaternaries on the free amine plus quaternary acetate content. For phosphate salts the percentage is based on amine phosphate or in the case of quaternaries on the amine phosphate plus quaternary phosphate content.

EXAMPLE 1

A kaolin clay suspension containing 10 grams of kaolin per 100 cc. and having a pH of about 2.5 as determined on the filtrate of an untreated portion was divided into four portions. To each of three portions, 0.1% by weight (on the weight of the kaolin) of a respective one of the polymers listed above was added. In Table AI, the improvement in filtration obtained by the addition of each of the several polymers is indicated. The first column designates the polymer added and subsequent columns indicate the total volume of accumulated filtrate in milliliters at the end of the time intervals designated in seconds.

*Table AI*

FILTRATE VOLUME (ML.) AT END OF TIME INTERVALS

| Polymer | 15 sec. | 30 sec. |
|---|---|---|
| None | | 19 |
| HPAN | 20 | 28 |
| PAM | 27 | 38 |
| K | 39 | 58 |

Note.—Even after 300 seconds, the filtrate of the control was only 66 ml.

EXAMPLE 2

Zircon sand is fused or fritted with sodium carbonate (about equimolecular proportions) and the sodium silicozirconate formed is dissolved in dilute sulfuric acid at about 105° C. The resulting liquor had a pH less than 0.1 and contained about 6.65% of suspended matter, mainly silicic acid and some insoluble silicates. To recovery the soluble zirconium sulfate, this liquor is filtered. Table AII shows the effectiveness of the addition of a polymer of the present invention in improving the rate of filtration. To a portion of the acidic suspension 0.3% (on the weight of suspended matter) of the polymer designated in the left column of Table AII is added.

*Table AII*

FILTRATE VOLUME (ML.) AT END OF TIME INTERVALS

| Polymer | 5 sec. | 10 sec. | 15 sec. | 20 sec. |
|---|---|---|---|---|
| None | 16 | 27 | 40 | 51 |
| K | 23 | 40 | 57 | 67 |

EXAMPLE 3

Filtration times of aqueous kaolin clay suspensions containing 10 grams of kaolin per 100 cc. of suspension and having various pH values are measured when various amounts (on the weight of kaolin) of Polymers A and AQ are added to separate portions of the suspension and compared with a control. Filtration pressure=24.3 cms. Hg. Table I summarizes the results, 100 cc. of suspension being filtered.

*Table I*

| Polymer | Percent polymer on clay | Filtration time (sec.) | |
|---|---|---|---|
| | | pH=10±0.1 | pH=12.0±0.1 |
| None | | 910 | 965 |
| A | 0.01 | 410 | 860 |
| AQ | 0.01 | 165 | 520 |
| A | 0.05 | 140 | 450 |
| AQ | 0.05 | 88 | 145 |
| A | 0.10 | 74 | 370 |
| AQ | 0.10 | 27 | 76 |

EXAMPLE 4

The total filtration times required for the filtration under a pressure of 24.3 cms. Hg of aqueous suspensions containing 10 grams of kaolin per 100 cc. of suspension having a pH of 12±0.1 and treated with various percentages of the polymers (based on the weight of kaolin) are given in Table II, 100 cc. of suspension being filtered.

*Table II*

| Polymer | Percent polymer on clay | Filtration time (sec.) |
|---|---|---|
| None | | 965 |
| B | 0.05 | 580 |
| B | 0.10 | 435 |
| BQ-1 | 0.05 | 200 |
| BQ-1 | 0.10 | 115 |
| BQ-2 | 0.05 | 129 |
| BQ-2 | 0.10 | 77 |
| A | 0.05 | 450 |
| A | 0.10 | 370 |
| AQ | 0.05 | 145 |
| AQ | 0.10 | 76 |
| E | 0.05 | 870 |
| E | 0.10 | 855 |
| EQ | 0.05 | 280 |
| EQ | 0.10 | 145 |
| C | 0.05 | 540 |
| C | 0.10 | 460 |
| CQ-1 | 0.05 | 155 |
| CQ-1 | 0.10 | 97 |

EXAMPLE 5

Sedimentation volumes (after 24 hours) and comparative filtration rates are determined on aqueous suspensions of 10 grams of kaolin per 100 cc. of suspension containing 0.105 N NaOH and 1.05 N NaOH and various amounts of polymers C, CQ-1, and CQ-2 (based on the weight of kaolin). Table III summarizes the results based on 100 cc. portions.

*Table III*

| Polymer | Percent polymer on weight of kaolin | NaOH (N) | Sedimentation vol. -24 hrs. (cc.) | Vol. of filtrate (cc) Time (sec.) | | | |
|---|---|---|---|---|---|---|---|
| | | | | 30 | 60 | 90 | 300 |
| None | | 0.105 | 30 | 24 | 33 | 42.5 | 74.5 |
| C | 0.10 | do | 35 | 30 | 44 | 54 | |
| CQ-1 | 0.10 | do | 49 | 46.5 | 67 | 82 | |
| CQ-2 | 0.10 | do | 49 | 48 | 70 | 84 | |
| None | | 1.05 | 28 | 30 | 45 | 56 | |
| C | 0.10 | do | 28.5 | 28.5 | 42 | 53 | |
| CQ-1 | 0.10 | do | 37 | 47 | 67 | 85 | |
| CQ-2 | 0.10 | do | 37.5 | 49 | 71 | | |

EXAMPLE 6

Table IV summarizes the total filtration times of 100 cc. of aqueous 0.89% $Fe(OH)_3$ suspensions having a pH of 12.0±0.1 in the presence of added polymers. The pressure of filtration is 12.5 lbs. per square inch.

Table IV

| Polymer | Percent polymer on weight of Fe(OH)₃ | Total filtration time (secs.) |
|---|---|---|
| None | | 198 |
| A | 1.50 | 163 |
| A | 3.00 | 185 |
| AQ | 0.75 | 103 |
| AQ | 1.50 | 65 |
| AQ | 3.00 | 48 |

EXAMPLE 7

The addition to a very turbid aqueous suspension from a South African diamond mine containing 2.8 grams of montmorillonite clay per 100 cc. of suspension (pH=9.3) of 0.25 and 0.50% (by weight on the clay) of Polymer CQ-2 produced large floccules and a very slightly turbid supernatant.

EXAMPLE 8

In this example, several portions of a hot concentrated aqueous carbonate liquor containing suspended siliceous material and having a pH of 9.5 are treated with Polymer D and Polymer DQ respectively. The suspension contained 25.1 grams sodium carbonate per 100 cc., 10.0 grams sodium bicarbonate per 100 cc. and 0.64 gram of insoluble siliceous material per 100 cc. The insoluble material contained by analysis approximately 28.3% $SiO_2$ and 13% combined oxides and 13.4% calcium oxide. Each of the flocculants are added at doses of 1, 5, and 10 parts per million of the suspension at 93° C. Polymer D is ineffective, being itself precipitated from the solution. Polymer DQ is highly effective at 5 and 10 p.p.m. levels giving large floccules and very clear supernatants.

EXAMPLE 9

Several portions of a digested sewage sludge containing 10 grams of suspended matter of predominantly organic character per 100 cc. volume and having a pH of 7.4 are treated with different amounts of flocculating agents of the invention, and one portion is treated with 3% of ferric chloride ($FeCl_3$) and 6% of lime (CaO) (both percentages based on weight of suspended matter) for comparative purposes. The treated portions are then filtered using a vacuum leaf filter provided with a polyethylene filter cloth at 74° F. under 22 inches Hg vacuum using a 1.0 minute form period, a 2.0 minute drying period, and a 0.5 minute discharge period. In Table A, the third column gives the average filtrate rate time of the several treated portions during the aforesaid filtration time, and the fourth column gives the filtration rate in terms of dry weight of cake obtained.

Table A

| Polymer | Weight percent polymer (on weight suspended solids) | Filtrate rate gals./hr./sq. ft. | Dry lbs./hr. per sq. ft. |
|---|---|---|---|
| FeCl₃ | 3.0 | 5.22 | 4.27 |
| CaO | 6.0 | | |
| Polymer FQ | 0.125 | 2.91 | 2.46 |
| Do | 0.175 | 4.09 | 3.25 |
| Do | 0.225 | 6.45 | 4.69 |

EXAMPLE 10

Several portions of a digested sewage sludge, containing 8.1 grams of suspended matter of predominantly organic character per 100 cc. volume and having a pH of 7.2 are treated with different amounts of Polymer FQ, and other portions are treated with various amounts of a mixture of ferric chloride and lime, and still one additional portion is treated with a mixture of the polymer with ferric chloride and lime. The treated portions are then filtered using a vacuum leaf filter provided with a polyethylene filter cloth at 74° F. under 22 inches Hg vacuum, using a one minute form period, a two minute drying period, and a 0.5 minute discharge period. Table B gives the comparative filtrate rates and filtration rates based on dry weight of filter cake obtained:

Table B

| Polymer | Weight percent polymer (on weight suspended solids) | Filtrate rate gals./hr./sq. ft. | Dry lbs./hr. per sq. ft. |
|---|---|---|---|
| FeCl₃ | 1.5 | 2.32 | 1.16 |
| CaO | 3 | | |
| FeCl₃ | 3 | 5.82 | 3.72 |
| CaO | 6 | | |
| FeCl₃ | 4.5 | 8.27 | 5.40 |
| CaO | 9 | | |
| FeCl₃ | 1.5 | 3.68 | 2.30 |
| CaO | 3.0 | | |
| Polymer FQ | 0.062 | | |
| Do | 0.092 | 3.81 | 2.42 |
| Do | 0.123 | 4.95 | 3.02 |
| Do | 0.154 | 7.08 | 3.74 |
| Do | 0.184 | 9.71 | 3.93 |
| Do | 0.215 | 9.63 | 4.65 |

EXAMPLE 11

Table C summarizes the results of filtration of a suspension of a high abrasion furnace black of very fine particle size having an average particle size of 0.036 micron dispersed with 3.0% by weight (on weight of carbon black) of the condensate of sodium naphthalene sulfonate with formaldehyde. The concentration of the suspension was 10 grams of carbon black per 100 grams of suspension. In each case, 100 grams of the suspension was filtered at 25° C. in a filter press at 6 lbs./sq. in. pressure. The pH of the control suspension was 8.95. Column 3 of the table gives the filtration time in seconds; the fourth column gives the volume of filtrate in cubic centimeters; and the fifth column indicates the character of the filtrate. Only when the polymers of the invention were employed was there a complete filtration of the sample accomplished within the time periods given.

Table C

| Polymer | Percent polymer | Filtration time (sec.) | Volume of filtrate (cc.) | Nature of filtrate |
|---|---|---|---|---|
| None | | 900 | 19 | Black. |
| GQ | 5.0 | ¹200 | 51.5 | Clear. |
| CQ-1 | 5.0 | ¹142 | 52.0 | Do. |
| PAM-2 | 5.0 | 900 | 25.5 | Slightly turbid. |
| HPAN | 5.0 | 900 | 3 | Black. |

¹ Complete filtration of sample.

EXAMPLE 12

In Table D, the effect of the addition of the polymers of the present invention in the sedimentation of an aqueous dispersion of Carbanthrene Yellow G Double Paste (color index 1118) is shown. A suspension containing 0.50 gram of the dyestuff per 100 ccs. and 5.00% of the various polymers listed in the table were added, this percentage being based on the weight of dyestuff. The pH of the control was 9.02. When the polymers of the present invention were added, large flocs formed and settled rapidly. The sedimentation volume in ccs. is listed in the third column of the table and the appearance of the supernatant liquor is indicated in the fourth column of the table. The use of flocculants of the present invention serves to prevent pollution and facilitates the recovery of a rather expensive dyestuff. In the table, the symbols used are as follows:

| | |
|---|---|
| T | Turbid. |
| RT | Reduced turbidity. |
| ST | Slightly turbid. |
| C | Clear. |
| AC | Almost clear. |

Table D

| Polymer | Effect | Volume of sediment (cc.) | Supernatant |
|---|---|---|---|
| None | No flocculation | No settling | T. |
| BQ-1 | Large flocs | 20 | ST. |
| BQ-2 | do | 22 | AC. |
| CQ-1 | do | 22 | C. |
| CQ-2 | do | 22 | ST. |
| GQ | do | 23 | C. |
| PAM-2 | No flocculation | 2 (essentially no settling) | T. |
| HPAN | do | No settling | T. |

It is to be understood that changes and variations may be made without departing from the spirit and scope of the invention as defined in the appended claims.

We claim:

1. The process of facilitating the dewatering of aqueous suspensions of finely divided water-soluble, solid materials which comprises mixing into such suspensions from 0.001% to 5% by weight, based on the weight of suspended matter, of a water-soluble linear polymer selected from the group consisting of polymers having free amine groups and salts thereof having a viscosity average molecular weight of at least 300,000 and containing 0 to about 55 mole percent of at least one ester unit having the formula:

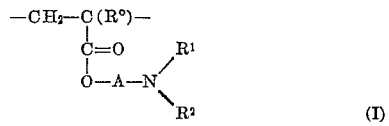

and about 45 to 100 mole percent of at least one quaternary unit having the formula:

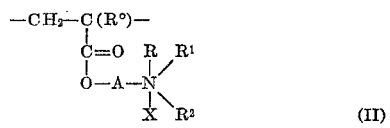

where

R° is selected from the group consisting of H and CH₃,

A is selected from the group consisting of —(CH₂)₂—, —(CH₂)₃— and —CH₂CH(CH₃)—,

R¹ is selected from the group consisting of methyl and ethyl,

R² is selected from the group consisting of methyl and ethyl,

R is selected from the group consisting of β-hydroxyethyl, β-hydroxypropyl, and γ-hydroxypropyl, and X is selected from the group consisting of hydroxyl and negative, salt-forming atoms and radicals.

2. The process as defined in claim 1 in which the suspended matter is a mineral.

3. The process as defined in claim 1 in which the suspension has a pH of 9 to 14.

4. The process as defined in claim 1 in which the suspension has a pH of 0 to 4.

5. The process as defined in claim 1 in which the polymer has a viscosity average molecular weight of at least 500,000.

6. The process as defined in claim 1 in which the polymer has a viscosity average molecular weight of several million.

7. The process as defined in claim 1 in which the removal of water involves a filtration step.

8. The process as defined in claim 1 in which the removal of water involves a decantation step.

9. A process of facilitating the dewatering of an acid aqueous suspension of finely divided inorganic material having a pH between 0 and 4 and containing dissolved therein a salt of a metal to be recovered, said suspension being the product of the acid-leaching of a substance selected from the group consisting of an ore containing the aforesaid metal and the product of an alkaline fusion of such an ore, which comprises mixing into such a suspension from 0.001% to 3% by weight, based on the weight of suspended matter, of a water-soluble linear polymer, having a viscosity average molecular weight of at least 300,000, of dimethylaminoethyl methacrylate having at least 45% of its units quaternized with ethylene oxide, and filtering the aqueous system thereby obtained.

10. A process of facilitating the dewatering of an acid aqueous suspension of finely divided inorganic material having a pH between 0 and 4 and containing dissolved therein a salt of a metal to be recovered, said suspension being the product of the acid-leaching of a substance selected from the group consisting of an ore containing the aforesaid metal and the product of an alkaline fusion of such an ore, which comprises mixing into such a suspension from 0.001% to 3% by weight, based on the weight of suspended matter, of a water-soluble linear polymer, having a viscosity average molecular weight of at least 300,000, of dimethylaminoethyl methacrylate having at least 45% of its units quaternized with propylene oxide, and filtering the aqueous system thereby obtained.

11. A process of facilitating the dewatering of alkaline aqueous suspensions of finely divided inorganic material which comprises mixing into such a suspension from 0.001% to 3% by weight, based on the weight of suspended matter, of a water-soluble linear polymer, having a viscosity average molecular weight of at least 300,000, of dimethylaminoethyl methacrylate having at least 45% of its units quaternized with propylene oxide, and filtering the aqueous system thereby obtained.

12. A process of facilitating the dewatering of alkaline aqueous suspensions of finely divided inorganic materials which comprises mixing into such a suspension from 0.001% to 3% by weight, based on the weight of suspended matter, of a water-soluble linear polymer, having a viscosity average molecular weight of at least 300,000, of dimethylaminoethyl methacrylate having at least 45% of its units quaternized with ethylene oxide, and filtering the aqueous system thereby obtained.

13. A process of facilitating the dewatering of alkaline aqueous suspensions of finely divided inorganic materials which comprises mixing into such a suspension from 0.001% to 3% by weight, based on the weight of suspended matter, of a water-soluble linear polymer, having a viscosity average molecular weight of at least 300,000, of dimethylaminoethyl methacrylate having at least 80% of its units quaternized with ethylene oxide, and filtering the aqueous system thereby obtained.

14. A process of facilitating the dewatering of alkaline aqueous suspensions of finely divided inorganic materials which comprises mixing into such a suspension from 0.001% to 3% by weight, based on the weight of suspended matter, of a water-soluble linear polymer, having a viscosity average molecular weight of at least 300,000, of dimethylaminoethyl methacrylate having at least 80% of its units quaternized with propylene oxide, and filtering the aqueous system thereby obtained.

15. The process as defined in claim 1 in which the suspended matter is predominantly organic.

16. The process as defined in claim 1 in which the suspension is an aqueous digested sewage sludge suspension and at least 0.01% of the water-soluble polymer is added to the suspension.

17. A process as defined in claim 16 in which the polymeric substance added is a water-soluble salt of a homopolymer of β-(N,N-dimethylamino)ethyl methacrylate having a viscosity average molecular weight of several million and having about 87½% of its units quaternized by ethylene oxide.

(References on following page)

References Cited in the file of this patent

UNITED STATES PATENTS

| | | |
|---|---|---|
| 2,149,748 | Samuel | Mar. 7, 1939 |
| 2,625,529 | Hedrick et al. | Jan. 13, 1953 |
| 2,729,557 | Booth et al. | Jan. 3, 1956 |
| 2,740,522 | Aimone et al. | Apr. 3, 1956 |
| 2,817,649 | Contois | Dec. 24, 1957 |

FOREIGN PATENTS

| | | |
|---|---|---|
| 154,799 | Australia | Jan. 19, 1954 |

OTHER REFERENCES

Ruehrwein et al.: "Soil Science," vol. 73, No. 6, pages 485–492.

Michaels: "Ind. and Eng. Chem.," vol. 46, No. 7, pages 1485–1492.

UNITED STATES PATENT OFFICE
CERTIFICATE OF CORRECTION

Patent No. 3,023,162                  February 27, 1962

David B. Fordyce et al.

It is hereby certified that error appears in the above numbered patent requiring correction and that the said Letters Patent should read as corrected below.

Column 11, line 18, for "water-soluble" read -- water-insoluble --.

Signed and sealed this 26th day of February 1963.

(SEAL)
Attest:

ESTON G. JOHNSON                     DAVID L. LADD

Attesting Officer                      Commissioner of Patents